US009582547B2

(12) United States Patent
Roberts et al.

(10) Patent No.: US 9,582,547 B2
(45) Date of Patent: Feb. 28, 2017

(54) GENERALIZED GRAPH, RULE, AND SPATIAL STRUCTURE BASED RECOMMENDATION ENGINE

(71) Applicant: Palo Alto Research Center Incorporated, Palo Alto, CA (US)

(72) Inventors: Michael Roberts, Los Gatos, CA (US); Shane P. Ahern, Foster City, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 615 days.

(21) Appl. No.: 14/083,285

(22) Filed: Nov. 18, 2013

(65) Prior Publication Data
US 2015/0142785 A1 May 21, 2015

(51) Int. Cl.
*G06F 17/30* (2006.01)
*G06Q 30/06* (2012.01)

(52) U.S. Cl.
CPC ...... *G06F 17/3053* (2013.01); *G06F 17/3069* (2013.01); *G06F 17/30333* (2013.01); *G06F 17/30528* (2013.01); *G06F 17/30702* (2013.01); *G06F 17/30705* (2013.01); *G06Q 30/06* (2013.01)

(58) Field of Classification Search
USPC .................................................. 707/706, 723
See application file for complete search history.

(56) References Cited

U.S. PATENT DOCUMENTS

| 7,424,488 | B2* | 9/2008 | Aggarwal | G06F 17/30017 |
| 8,412,796 | B2* | 4/2013 | Smyth | G06F 17/3089 709/217 |
| 8,494,978 | B2* | 7/2013 | Pinckney | G06N 99/005 706/11 |
| 8,635,241 | B2* | 1/2014 | Mori | G06F 17/3087 707/767 |
| 9,009,096 | B2* | 4/2015 | Pinckney | 706/52 |
| 9,208,439 | B2* | 12/2015 | Roberts | G06N 5/02 |
| 9,251,525 | B2* | 2/2016 | Picault | G06Q 30/02 |
| 9,355,361 | B2* | 5/2016 | Pinckney | G06N 99/005 |

* cited by examiner

*Primary Examiner* — Kim Nguyen
(74) *Attorney, Agent, or Firm* — Shun Yao; Park, Vaughan, Fleming & Dowler LLP (57) ABSTRACT

One embodiment of the present invention provides a recommendation system. During operation, the system receives context information associated with the user, updates a plurality of user models based on the received context information, and identifies at least one spatial data structure that stores a plurality of items. A respective item is stored within the spatial data structure based on a vector value associated with the item. The system then queries the spatial data structure to obtain a first set of recommendable items that have vector values within a predetermined range, calculates a score for each item within the set of recommendable items based on the plurality of the user models and a characterization vector associated with each item, ranks the items within the set of recommendable items based on calculated scores, and recommends one or more top-ranked items to the user.

19 Claims, 6 Drawing Sheets

GENERALIZED GRAPH, RULE, AND SPATIAL STRUCTURE BASED RECOMMENDATION ENGINE

BACKGROUND

Field

This disclosure is generally related to a recommendation system. More specifically, this disclosure is related to a general recommendation system capable of providing recommendations over multiple domains.

Related Art

As mobile devices equipped with technology to detect user context, such as physical surroundings, become more pervasive in our everyday lives, context-aware recommendation applications that detect and make use of physical surroundings can increasingly contribute to improving the lifestyle of mobile device users. Such software includes context-aware systems that may adapt to the computing environment, including physical surroundings, and make recommendations based on the physical surroundings. A context-aware system on a mobile device detects the computing environment and adapts to changing conditions detected from the environment, such as location and movement of the mobile device, nearby devices, and other surrounding conditions. Additional user context can also be extracted from various user events, such as web pages or documents viewed by the user, the user's past activities, interest expressed by the user, etc.

Such context-aware systems may establish various user models based on different user contexts. A user model can be used to describe user behaviors and interests. A context-based recommendation system may then recommend activities, such as leisure activities, based on a user model. However, providing a context-based recommendation system that can include a large number of potentially recommendable items and support a large number of concurrent users can be computationally challenging. Moreover, conventional recommendation systems often are not able to incorporate different user models.

SUMMARY

One embodiment of the present invention provides a recommendation system. During operation, the system receives context information associated with the user, updates a plurality of user models based on the received context information, and identifies at least one spatial data structure that stores a plurality of items. A respective item is stored within the spatial data structure based on a vector value associated with the item. The system then queries the spatial data structure to obtain a first set of recommendable items that have vector values within a predetermined range, calculates a score for each item within the set of recommendable items based on the plurality of the user models and a characterization vector associated with each item, ranks the items within the set of recommendable items based on calculated scores, and recommends one or more top-ranked items to the user.

In a variation on this embodiment, calculating the score involves calculating a model-specific output for each user model and calculating a weighted sum of model-specific outputs over the plurality of user models.

In a further variation, calculating the model-specific output involves identifying elements in the characterization vector that correspond to parameters of the user model and calculating the model-specific output as a function of the identified elements and the corresponding parameters of the user model.

In a variation on this embodiment, the system identifies an additional spatial data structure that corresponds to a different vector space, queries the additional spatial data structure to obtain a second set of recommendable items, and generates a combined set of recommendable items using the first and the second sets of recommendable items.

In a variation on this embodiment, the plurality of items includes one or more of: a web page, a consumer item, an activity, a venue, and a location.

In a variation on this embodiment, the system updates a context graph associated with the user based on the received context information.

In a variation on this embodiment, the spatial data structure is segmented into cells, and wherein a respective cell stores items having vector values within boundaries of the cell.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a method and a system that provide context-based recommendations in a number of different domains. More specifically, the system includes a number of different characterization systems, each for a particular content type. The characterization system can be used to generate characterization vectors for potentially recommendable items, and elements in a characterization vector receive normalized scores associated with the corresponding recommendation item. The characterization vectors are stored in an item database which can be queried when the system makes a recommendation. To accelerate the recommendation computation, the system subdivides the space of the items by ranges of the characterization vector elements. When making a recommendation, only items have characterization vectors within a certain range (determined by the user context) are considered as recommendable items. The system further invokes a mixed model function which combines various user models to score and rank the recommendable items.

System Overview

Figure 1:
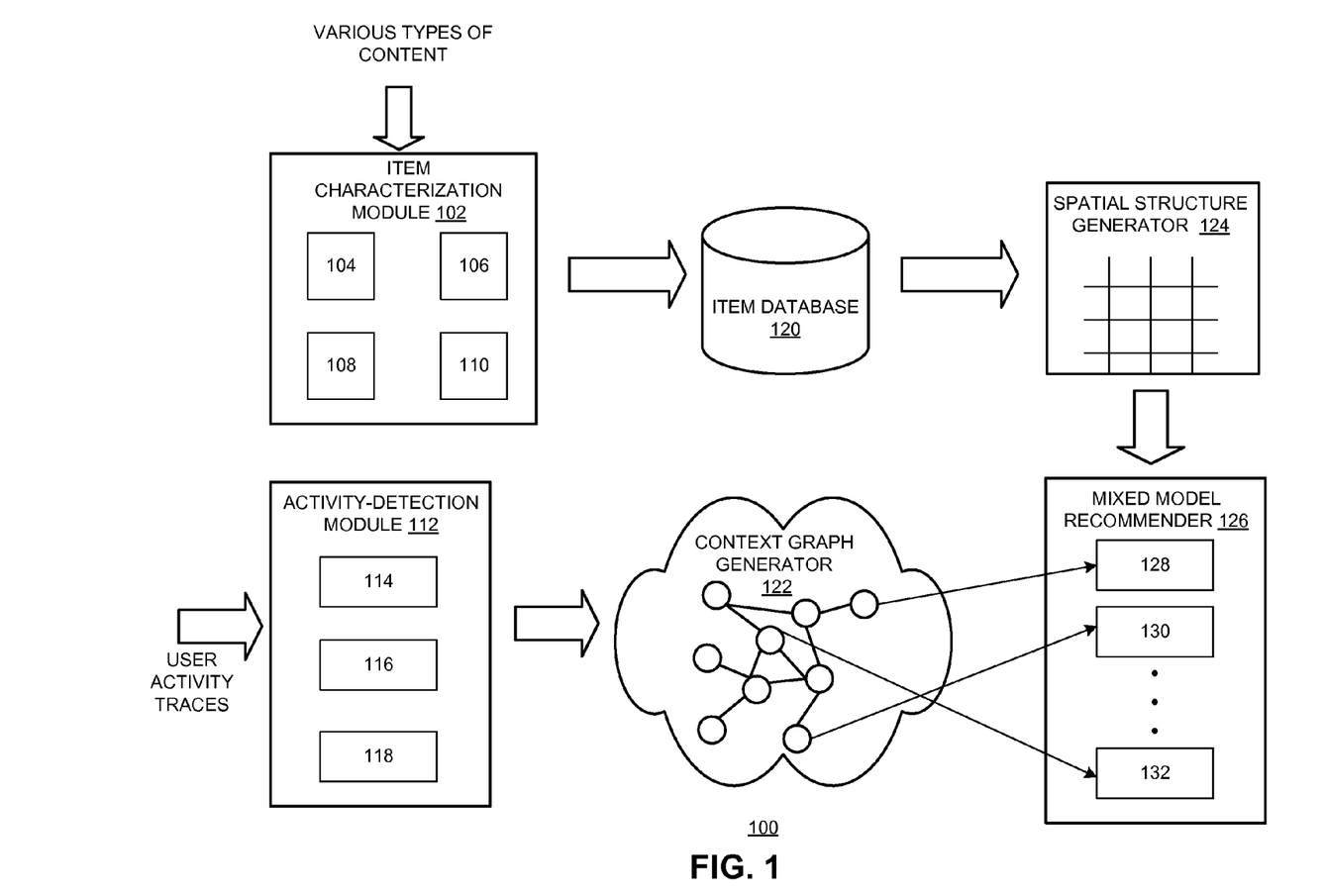
FIG. 1 presents a diagram illustrating an exemplary architecture of the context-based recommendation system, in accordance with an embodiment of the present invention.

FIG. 1 presents a diagram illustrating an exemplary architecture of the context-based recommendation system, in accordance with an embodiment of the present invention. In FIG. 1, recommendation system 100 includes an item characterization module 102, an activity detection module 112, an item database 120, a context graph generator 122, a spatial structure generator 124, and a mixed model recommender 126.

Item characterization module 102 is responsible for characterizing various potentially recommendable items. This characterization process can be performed offline. As shown in FIG. 1, item characterization module 102 includes a plurality of characterizers, such as characterizers 104, 106, 108, and 110. Note that each characterizer can be used for different content types. For example, characterizer 104 might be used for characterizing web pages or web documents. In one embodiment, a web-page characterizer may include a system based on an entity-extraction service, such as OpenCalais™ (trademark of Thomson Reuters Corporation of New York, N.Y.). More specifically, a web-page characterizer may feed web content to OpenCalais™, which extracts a list of entities, or canonical terms. The characterizer may then insert scores for these extracted terms into a characterization vector. Note that the characterization vector is a vector with an arbitrary number of elements or dimensions, with each element representing an aspect of the items. An exemplary characterization vector for a restaurant may include a number of regional elements (such as Asian, European, Southern, etc.), ethnicity elements (such as Chinese, That, Italian, etc.), price range elements (such as expensive, moderate, cheap, etc.), and so on. In one embodiment, all elements in the characterization vector (other than the location elements, which include latitude and longitude) receive normalized scores ranging between 0.0 and 1.0. In a further embodiment, these normalized scores are given by the characterizers. In the example of a web-page characterizer, it extracts canonical terms from the web page, and then assigns one or more top ranked terms a score of 1.0, and assigns lower ranked terms with lower scores. The characterizer then inserts these normalized scores (indexed with the corresponding canonical terms) into the characterization vector. Note that some of the lowest ranked terms may receive a score of 0 and are not included in the characterization vector. The characterization vector can be stored in a hash map of values indexed by the element names. For example, if the content of a web page includes restaurant reviews, the generated characterization vector for a particular restaurant may look like: {restaurant=1, Latitude=40° 20', Longitude=90°, That =1, Italian=0, Asian=1, Fine Dining=0.5, Casual Dining=0.5, . . . }. Note that elements that are not present in the hash can be assumed to have a value of 0. As one can see, the characterization vector is a way to quantitatively describe the various aspects of an item. In this example, the characterization vector represents a That restaurant; hence, the vector element measuring its "That" degree is given a value of 1.0. On the contrary, the vector element measuring its "Italian" degree is given a value of 0.0. The type (or price range) of the restaurant may be between fine dining and casual dining; thus, both elements are given a value of 0.5. Similarly, if the content of a web page includes political comments, the characterization vector may look like: {Democrat=0.2, Republican=0.3, Libertarian=0.5, . . . }. In one embodiment, when extracting and scoring the canonical terms, the characterizer may use a natural language parser and a term frequency-inverse document frequency (TF-IDF) ranking algorithm.

In addition to the web-page characterizer, other types of characterizers can also be included to characterize items of different types. For example, characterizer 106 can be a travel-destination characterizer, which includes a number of specific parsers responsible for "ripping" data from specific websites associated with the destinations or from user reviews (which can include entries in review websites, personal blogs, advertisements, etc.). Other item types may include, but are not limited to: consumer items (such as books, electronics, apparel, household products, etc.), actions (such as sports activity, leisure activity, special-interest activity, etc.), venues (such as stores, sport venues, clubs, theatres, medical facilities, etc.), geographic locations, and other types. For each particular type of item, specific modules (such as a characterizer or a module within a particular type of characterizer) can be employed to generate characterization vectors. In one embodiment, a particular item may be characterized by multiple characterizers because there might be various formats of information associated with a particular item. For example, if a recommendable item is engaging in an activity A in a venue B, both the activity characterizer and the venue characterizer will be employed to generate a characterization vector for this particular item. Note that certain machine-learning techniques may be used when characterizing an item. For example, trained classifiers can be used to mine the large amount of online and offline data in order to generate the characterization vectors.

Item database 120 receives and stores outputs from item characterization module 102. In one embodiment, item database 120 stores a number of items and their associated characterization vectors. In one embodiment, each item is associated with a characterization vector, which can be a massive vector. Note that the processes of characterizing and storing characterization vectors can occur offline. In one embodiment, recommendation system 100 can continuously build item database 120 by collecting and analyzing massive amounts of online and offline data. In a further embodiment, item database 120 may include manually generated characterization vectors. For example, a human worker can read restaurant reviews or try out the restaurant, and manually give normalized scores to the various aspects of the restaurant, thus generating a characterization vector for the restaurant. In a further embodiment, the characterizers may use a classifier, which can be initially trained by a human worker, such as the person reading the restaurant review. Once the classifier is trained, it can be used to classify (or characterize) restaurants automatically based on collected data.

As recommendation system 100 accumulates knowledge, the number of potentially recommendable items within item database 120 increases. In conventional approaches, the large number of items may lead to a large number of computations that are needed when the system makes a recommendation because an exhaustive search over all items is needed. This can be a problem if recommendation system 100 also supports a large number of users and may need to make simultaneous recommendations to multiple users. In order to solve this problem, in embodiments of the present invention, the items within item database 120 are fed into spatial structure generator 124, which generates spatial structures for these items by sub-dividing the space of the items by ranges within arbitrary characterization vector spaces. The division of the item space accelerates the recommendation computation because the system no long needs to search all possible items. Instead, the system may only need to consider a small set of items (which have element values within a particular range) and run recommendation calculations for these items only, thus reducing the number of needed computations. Depending on the modeling needs, the spatial structures can have different dimensions. Each spatial structure can represent a subset of dimensions of the item space. For example, if a user model is related to food, only food-related vector elements (such as Chinese food, That food, Italian food, etc) within the characterization vector for items are needed as inputs for the user model. Consequently, the spatial data structure may be constructed based on those food-related vector elements.

Figure 2A:
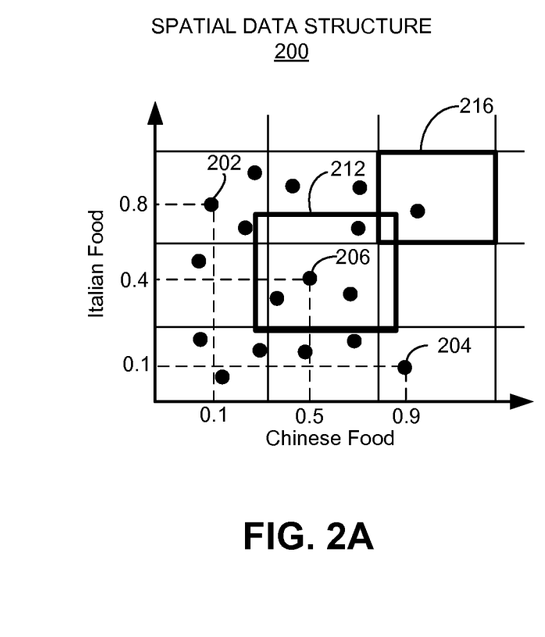
FIG. 2A presents a diagram illustrating an exemplary spatial data structure, in accordance with an embodiment of the present invention.
Figure 2B:
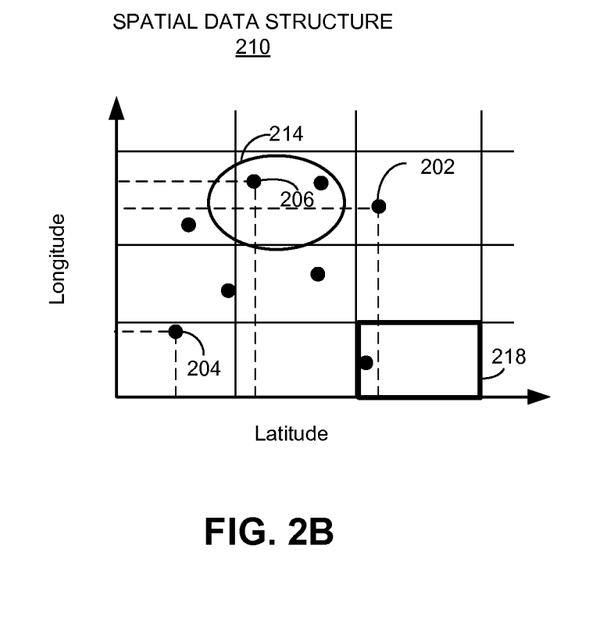
FIG. 2B presents a diagram illustrating an exemplary spatial data structure, in accordance with an embodiment of the present invention.

FIG. 2A presents a diagram illustrating an exemplary spatial data structure, in accordance with an embodiment of the present invention. In FIG. 2A, spatial data structure 200 is a two-dimensional vector space that includes a number of two-dimensional vectors, with each vector corresponding to an item in the item database. The horizontal component and the vertical component of the two-dimensional vector correspond to values of the selected elements in the characterization. In the example shown in FIG. 2A, spatial data structure 200 is a food-related spatial data structure, with the horizontal component being "Chinese food," and the vertical component being "Italian food." An item, which can be a restaurant, is placed in spatial data structure 200 based on the "Chinese" component and the "Italian" component of its characterization vector. For example, a restaurant 202, which is more of an Italian restaurant with little Chinese influence has a vector value of (0.1, 0.8), a restaurant 204, which is more of a Chinese restaurant with little Italian influence has a vector value of (0.9, 0.1), and the vector value of a restaurant 206, which is a Chinese-Italian fusion restaurant, is expressed as (0.5, 0.5). FIG. 2B presents a diagram illustrating an exemplary spatial data structure, in accordance with an embodiment of the present invention. In the example shown in FIG. 2B, the spatial data structure 210 is related to the geographic locations, and the horizontal and vertical components of a vector in spatial data structure 210 are the latitude and longitude, respectively, of an item. Restaurants 202, 204, and 206 are represented with different vectors in spatial data structure 210.

One advantage of placing items in spatial data structures is that the system can now accelerate recommendation calculations by placing "cages" within the spatial structure, such as a cage 212 in FIG. 2A and a cage 214 in FIG. 2B. The shape of the cages can be arbitrarily defined, either by the user or by the recommendation system. Only the items within the boundaries of the cages are being considered in the recommendation calculation. In the example shown in FIG. 2A, the system may determine (based on certain user preference models) that the user's preference includes Chinese-Italian fusion within a certain range (marked by cage 212), and only run recommendation calculations for restaurants having the Chinese-Italian vectors fall within the range. Other types of restaurants need not be considered for recommendation calculations. Similarly, the system may determine (based on the user's current location and other constraints) that the user may only be interested in restaurants within a certain geographic boundary (marked by cage 214), and run recommendation calculations for restaurants within such a geographic boundary.

In addition to indexing each item vector using its vector value, it is also possible to divide the spatial data structure into a number of segmentations, with each segment including one or more item vectors. The items can then be indexed using the index of the corresponding segmentations. In the example shown in FIGS. 2A and 2B, a set of grid lines can be used to divide the spatial data structure into a number of cells, such as cell 216 and cell 218. Each cell includes items having vector values fall within the cell boundary. In a further embodiment, each cell can have a horizontal index and a vertical index. For example, cell 216 may have a horizontal index of 3 and a vertical index of 3. Note that the spatial data structure needs not necessarily have a grid structure of cells, but could more generally encompass a graph structure of cells. Regardless of the specific segmentation method, one purpose of segmentation is to enable efficient retrievals of spatially approximated items. For example, in a grid-like spatial data structure, such as the one shown in FIG. 2A or 2B, the cells near a particular cell of interest can be easily retrieved by adding or subtracting 1 from the indices of the cell of interest. This operation can be completed without exploring items associated with more distant cells.

Note that we use a two-dimensional example in FIG. 2A for the sake of illustrative simplicity. In practice, spatial data structures may have more (such as 3, 4, 5, . . . ) or fewer dimensions.

Returning to FIG. 1, in addition to the offline processes that include the characterization of items and the generation of spatial structures associated with the items, recommendation system 100 involves real-time information flows. More specifically, activity-detection module 112 detects the user's activity, interest, or other state of interest related to the user's current and/or future activity, and processes, in real time, an incoming event stream to generate high-level assertions about the user's behavior and interests. In one embodiment, activity-detection module 112 includes a plurality of activity detectors, such as activity detectors 114, 116, and 118 The activity detectors are responsible for receiving lower-level user activity traces, such as GPS traces, accelerometer output, button-selections in applications, screen captures, etc., from various sensors located on a mobile device associated with a user. The activity detectors can further generate higher-level events or assertions about the user's behavior and interests based on the detected user context. A higher-level event can be, for example, a user reading email. A higher-level assertion can be, for example, a user preferring to read his email on the train ride to work.

Figure 3:
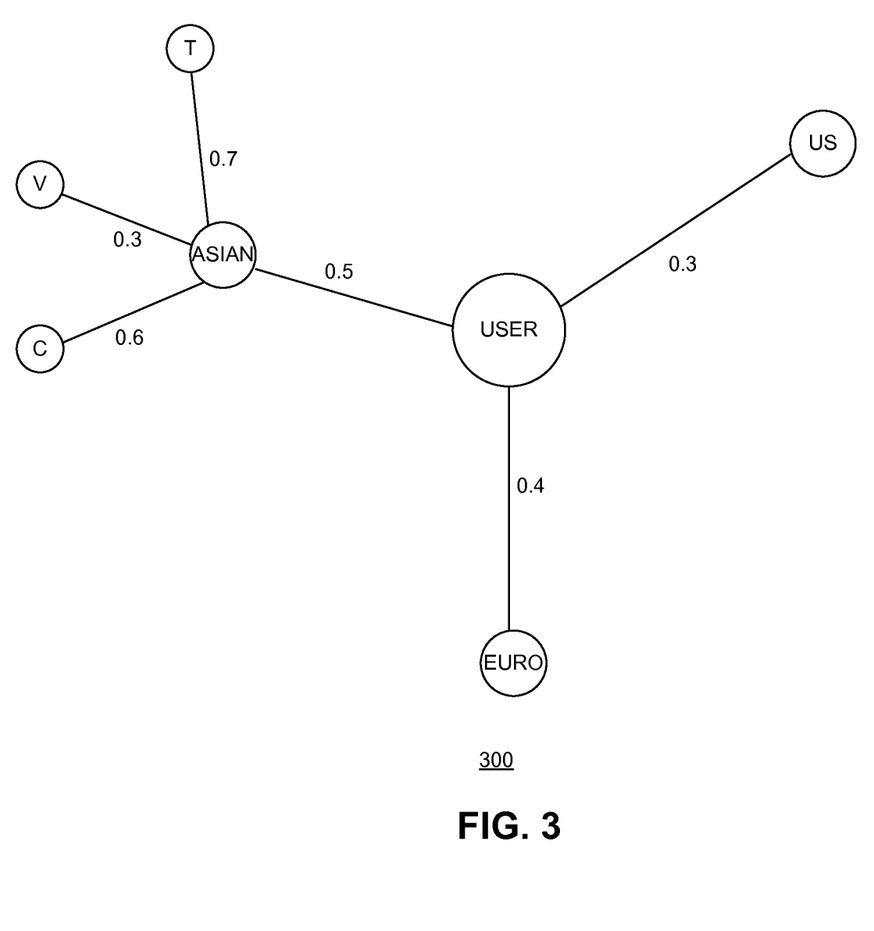
FIG. 3 presents an exemplary context graph, in accordance with an embodiment of the present invention.

The high-level events or assertions of the user's behavior and interests can be sent to a context-graph generator 122, which generates or modifies a context graph. A context graph is an in-memory model that stores facts and assertions about a user's behavior and interests. FIG. 3 presents an exemplary context graph, in accordance with an embodiment of the present invention. In the example shown in FIG. 3, context graph 300 describes a user's preference for various styles of food, such as Asian, American, or European. The number adjacent to the edges is the user's preference weight. The graph shows that among Asian foods, the user may have different preferences for Chinese, Vietnamese, or That food. In one embodiment, a client-server system can be used for generating context graphs. For example, a client (located on the user's mobile device) sends higher-level events or assertions about a user's behavior and interests to a remote server, which analyzes the event information to generate or modify a context graph.

The context graph is then sent to mixed model recommender 126, which includes a number of user models, such as user models 128, 130, and 132. Parameters included in the context graph can be used by mixed model recommender 126 to update the plurality of user models. For example, based on a restaurant review written by a user, the context graph associated with the user's food preference may be updated, which then leads to a user model that describes the user's food preference to be updated. Or, based on the current time and location of the user, the context graph and the user model may both be updated. For example, a user travelling to a foreign country may want to explore the local food, although he may not have expressed strong preferences for such food before. Note that, in addition to a context graph, other types of structures, such as a database or an in-memory storage can also be used to store user context parameters.

Mixed model recommender 126 is responsible for performing recommendation calculations based on the plurality of user models. In one embodiment, mixed model recommender 126 receives spatial structures from spatial structure generator 124, and determines based on model parameters which spatial structures contain recommendable items that can result in a positive expression of the model. For example, for a user model about the user's food preferences, spatial data structures that include food-related elements in the characterization vector may be selected. Note that elements within the characterization vector for an item may be grouped into a plurality of groups (with the possibility of overlapping among groups). Each group of elements may correspond to a user model and one or more data structures.

During operation, a utility of an item with respect to the user is calculated based on parameters of the user models and the characterization vector of the item. In one embodiment, the utility can be calculated as the weighted sum of all model outputs. Each model output can be a sum of a modeling function over all vector elements included in the model. For example, when making restaurant recommendations, the user's food preference model may use food-related elements within the characterization vectors as inputs to a food-related model. Other models, such as a location model or an economic model, may use different elements within the characterization vectors as inputs. In one embodiment, the output of a user model can include a numeric value. The different outputs from the different user models are then combined to generate a model-combined score for the item with respect to the user. The items can then be ranked based on the numerical scores, and the top ranked items are presented to the user as recommendations.

Note that instead of calculating utilities (or the model-combined score) for all items in the received spatial data structures, in one embodiment the system first assembles a set of recommendable items within each spatial data structure by computing a rough bound for the elements in the characterization vectors based on parameters in the user model. For example, if the spatial data structure input into a user model is related to the geographic locations, the system can draw a rough bound based on the user's current and future locations. If the spatial data structure is food-related, the bounds may be defined as an area within the Chinese-Asian vector space with a minimum "Chinese" vector element being 0.5 and a minimum "Asian fusion" vector being 0.7. The system then queries the spatial data structures for items within such bounds. Note that for segmented spatial data structures, the query can be performed much faster. In addition, only items within the set of recommendable items are included in the utility function calculation. By eliminating all other items from the utility calculations, which can be time-consuming, embodiments of the present invention enable an accelerated recommendation process.

When assembling the set of recommendable items, the system can simultaneously query all related spatial data structures and combine the results. In one embodiment, combining the query results can involve finding the intersection among all recommendable item sets. For example, when recommending restaurants, the system may query a number of food-related spatial data structures (which may include different sets of food-related vector elements), a location-based spatial data structure, and an economic-value based spatial data structure. In the example shown in FIGS. 2A and 2B, the boundary defined by cage 212 (shown in FIG. 2A) includes four items, while the boundary defined by cage 214 (shown in FIG. 2B) includes two items. The combined result for the query should be the intersection between the two sets of items within the two sets of boundaries, such as item 206. Note that, in practice, the boundary can be large and the combined query may still result in a relatively large set of recommendable items.

Figure 4:
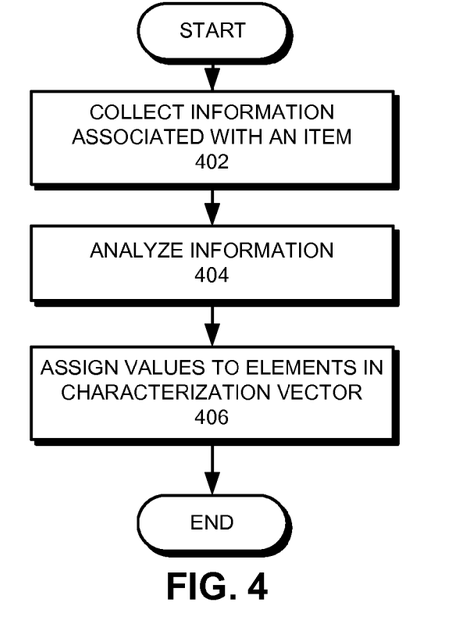
FIG. 4 presents a flowchart illustrating an exemplary process of generating a characterization vector for an item, in accordance with an embodiment of the present invention.

FIG. 4 presents a flowchart illustrating an exemplary process of generating a characterization vector for an item, in accordance with an embodiment of the present invention. During operation, the system collects information associated with an item (operation 402). Note that various types of information, including both online and offline information associated with an item can be collected. For example, if the item is a restaurant, then content on its own website, and customer reviews on various review websites can all be collected. In one embodiment, a web-crawler can be used to collect information. The system then analyzes the collected information (operation 404). Based on the types of information, different analyzers may be used. For example, if the collected information includes web documents, an entity-extraction mechanism can be used to extract canonical terms from the documents. Based on the analysis, the system can assign a value for elements in the characterization vector (operation 406). In one embodiment, the value can be a normalized score within the range between 0 and 1.0. In a further embodiment, such values might be manually assigned. Note that the characterization vector can be a massive vector that has an arbitrary number of elements and can be used to describe any items. Each element in the characterization vector can be used to measure an attribute of an item. Note that there is no limit in how many elements a characterization vector can have, although for most items, a great number of elements in their characterization vector are assigned a value of zero.

Figure 5:
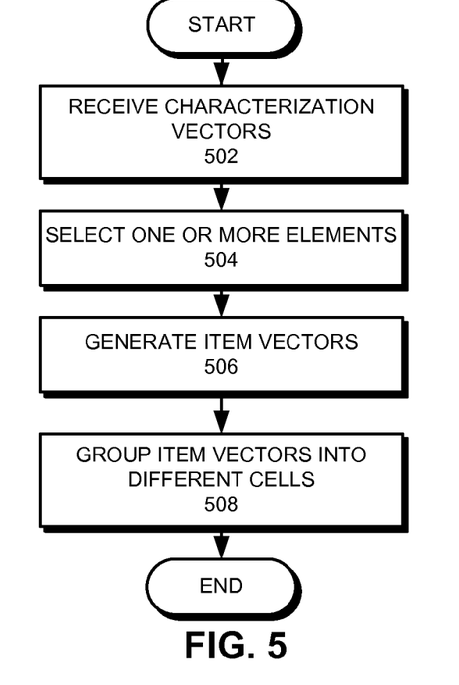
FIG. 5 presents a flowchart illustrating an exemplary process for generating a spatial data structure, in accordance with an embodiment of the present invention.

FIG. 5 presents a flowchart illustrating an exemplary process for generating a spatial data structure, in accordance with an embodiment of the present invention. During operation, the system receives characterization vectors for a number of items (operation 502), and selects one or more elements from the characterization vectors (operation 504). The system then generates a new set of item vectors by extracting the selected vector elements from the characterization vectors (operation 506). Each item is represented by the item vector comprising the selected one or more vector elements. For example, a generalized characterization vector for a restaurant may have hundreds of elements. However, vectors in the Chinese-Asian vector space only have a "Chinese" element and an "Asian" element. The item vectors are then grouped into different cells based on their vector value (operation 508). Each cell defines a boundary, and items with item vectors falling within the cell boundary are placed in the cell. Placing the items into different cells enables fast querying.

Figure 6:
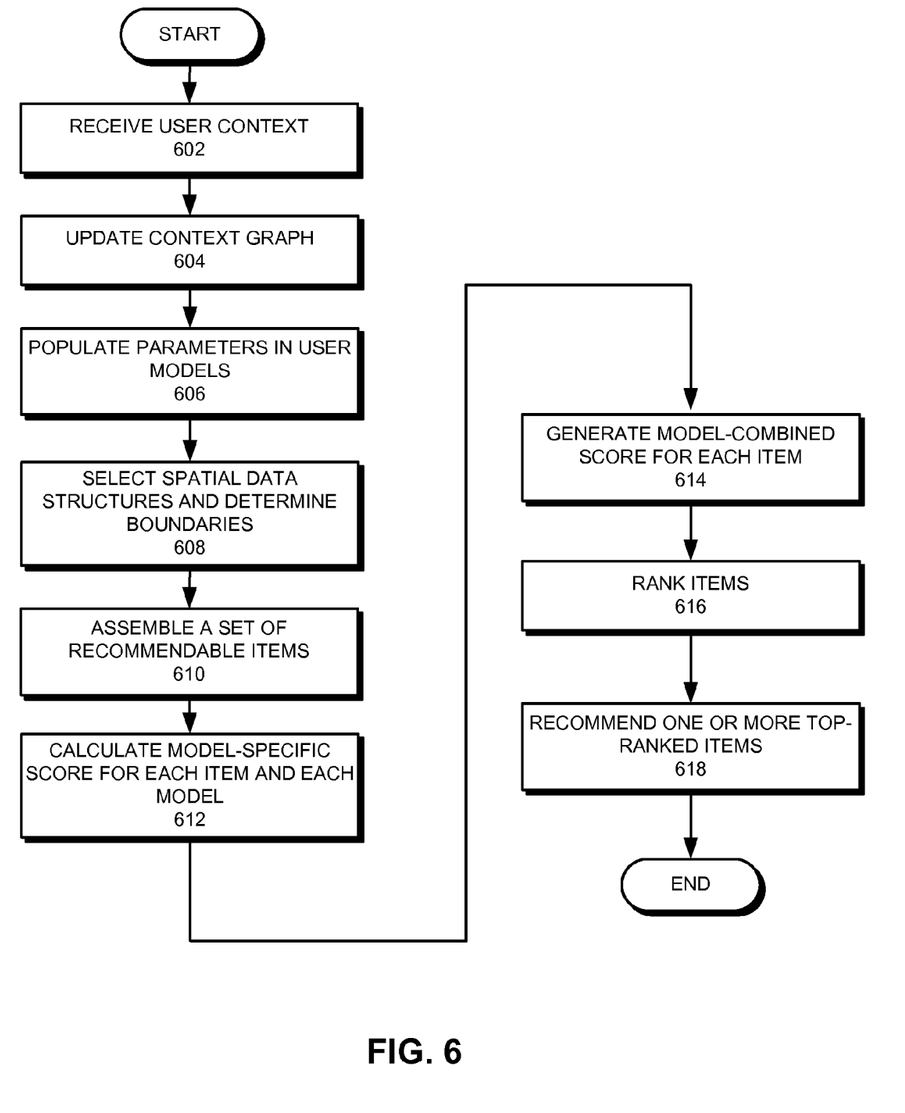
FIG. 6 presents a flowchart illustrating an exemplary process of making a recommendation to a user, in accordance with an embodiment of the present invention

FIG. 6 presents a flowchart illustrating an exemplary process of making a recommendation to a user, in accordance with an embodiment of the present invention. During operation, the system receives the user context information (operation 602). Note that the user context information can include lower-level user activity traces that are detected by a number of sensors located on a mobile device associated with a user. The sensors can include, but are not limited to: a clock, a GPS, an accelerometer, a temperature sensor, a light sensor, a sound sensor, a screen capturer, etc. The user context information can further include higher-level assertions of the user's behavior or interests deduced from the lower-level activity traces.

Subsequently, the system updates a context graph associated with the user based on the received user context (operation 604). Parameters included in the updated context graph are then populated among multiple user models to update the user models (operation 606). Note that, in addition to using a context graph to reflect changes in user context, other systems, such as a rule-based system, can also be used here to update the user models. Subsequent to updating the user models, the system selects a number of spatial data structures corresponding to the user models and determines boundaries for the spatial data structures based on the parameters of the user models (operation 608). Note that, depending on the system need, the spatial data structures may have various dimensions. Each user model may correspond to one or more spatial data structures. The boundaries define acceptable ranges of values of the corresponding vector elements. Based on the boundaries, the system assembles a set of recommendable items (operation 610). In one embodiment, to assemble the set of recommendable items, the system simultaneously queries the multiple selected spatial data structures for items within the determined boundaries, and then combines the query outputs.

For each item in the set of recommendable items, and for each user model, the system calculates a model-specific score based on the corresponding item vector (which includes vector elements that can be used as inputs for the user model) and the user model parameters (operation 612). In one embodiment, the model-specific score can be calculated by applying a modeling function (as defined by the user model) to the item vector and the user-preference vector (based on the user model parameters). For example, if the user model is about the user's preferences for food of different ethnicities, then the item vector of a restaurant may include elements that are used to describe ethnicity of the restaurant. The calculation of the modeling function then involves the extracted vector elements (such as the ethnicity of the restaurant) and the corresponding user model parameters (such as the user's preference for food of various ethnicities. In one embodiment, the modeling function can be a dot product, which is the sum of the products of an element in the characterization vector and a corresponding user preference over all extracted vector elements. For example, if a restaurant has a "Chinese" vector element with a value of 0.5 and an "Asian fusion" element with a value of 0.7, and the user's preference levels for Chinese food and Asian fusion food are 0.3 and 0.1, respectively, then the output of the Chinese-Asian fusion food model (the model only considers two factors, the Chinese factor and the Asian fusion factor) can be calculated as: $0.5 \times 0.3 + 0.7 \times 0.1 = 0.22$. The output of the user model is the model-specific score for the item with respect to the user. In one embodiment, the output of a user model includes a single numerical value.

Subsequently, for each item, the system combines the model-specific scores of all user models to generate a model-combined score (operation 614). This combined score is the mixed-model output. In one embodiment, this combined score is a weighted sum of all model-specific scores. For example, when making restaurant recommendations, the system may combine the food-ethnicity model, the location model, and the economic model to generate a mixed-model output. Each model may be assigned a weight, which can be manually input by the user or automatically assigned by the system based on observed user behavior. For example, the location model may receive a higher weight than the food-ethnicity model if the user is more concerned about getting to the restaurant quickly than the type of food. Similarly, the economic model may receive the highest weight if the user is on a tight budget. Subsequent to calculating the mixed-model output for all items within the set of the recommendable items, the system ranks these items based on their model-combined scores (operation 616), and recommends one or more top-ranked items to the user (operation 618).

In general, embodiments of the presented invention provide a general, fast-response recommendation system. More specifically, recommendation calculation can be accelerated by pre-selecting a set of recommendable items, which is a subset of all available items. In addition, the items are placed in a number of spatial data structures, each spatial data structure capturing a different facet of the information stored in the database. When pre-selecting the set of recommendable items, multiple spatial data structures can be used to generate a combined result. To further accelerate the process, a spatial data structure can also be segmented into different cells where item vectors are stored into these cells based on their vector values, hence enabling faster querying into the spatial data structure.

Computer System

Figure 7:
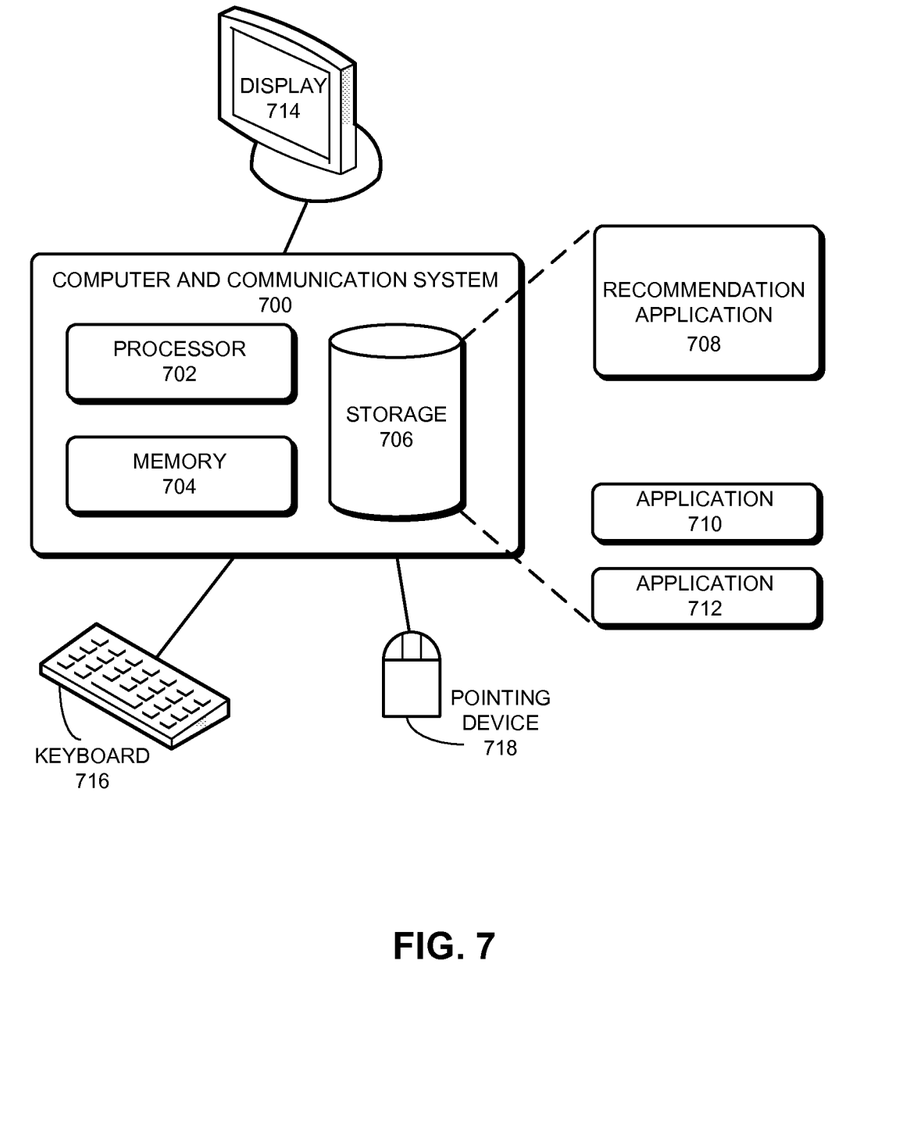
FIG. 7 illustrates an exemplary computer system for providing recommendations to users, in accordance with one embodiment of the present invention.

FIG. 7 illustrates an exemplary computer system for providing recommendations to users, in accordance with one embodiment of the present invention. In one embodiment, a computer and communication system 700 includes a processor 702, a memory 704, and a storage device 706. Storage device 706 stores a recommendation application 708, as well as other applications, such as applications 710 and 712. During operation, recommendation application 708 is loaded from storage device 706 into memory 704 and then executed by processor 702. While executing the program, processor 702 performs the aforementioned functions. Computer and communication system 700 is coupled to an optional display 714, keyboard 716, and pointing device 718.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for providing a recommendation to a user, comprising:
   receiving context information associated with the user;
   updating a plurality of user models based on the received context information;
   identifying a spatial data structure that stores a plurality of items, wherein the spatial data structure corresponds to a vector space, and wherein a respective item is stored within the spatial data structure based on a vector value associated with the item;
   determining a subspace within the vector space based on the updated user models, wherein boundaries of the subspace indicate acceptable ranges of vector values;
   querying the spatial data structure to obtain a first set of recommendable items that are included in the determined subspace;
   calculating a score for each item within the obtained first set of recommendable items based on the plurality of the user models and a characterization vector associated with each item, wherein calculating the score involves calculating a model-specific output for each user model and calculating a weighted sum of model-specific outputs over the plurality of user models;
   ranking the items within the obtained first set of recommendable items based on calculated scores; and
   recommending one or more top-ranked items to the user.

2. The method of claim 1, wherein calculating the model-specific output involves:
   identifying elements in the characterization vector that correspond to parameters of the user model; and
   calculating the model-specific output as a function of the identified elements and the corresponding parameters of the user model.

3. The method of claim 1, further comprising:
   identifying an additional spatial data structure that corresponds to a different vector space;
   querying the additional spatial data structure to obtain a second set of recommendable items; and
   generating a combined set of recommendable items using the first and the second sets of recommendable items.

4. The method of claim 1, wherein the plurality of items includes one or more of:
   a web page;
   a consumer item;
   an activity;
   a venue; and
   a location.

5. The method of claim 1, further comprising updating a context graph associated with the user based on the received context information.

6. The method of claim 1, wherein the spatial data structure is segmented into cells, and wherein a respective cell stores items having vector values within boundaries of the cell.

7. A non-transitory computer-readable storage medium storing instructions that when executed by a computer cause the computer to perform a method for providing a recommendation to a user, the method comprising:
   receiving context information associated with the user;
   updating a plurality of user models based on the received context information;
   identifying a spatial data structure that stores a plurality of items, wherein the spatial data structure corresponds to a vector space, and wherein a respective item is stored within the spatial data structure based on a vector value associated with the item;
   determining a subspace within the vector space based on the updated user models, wherein boundaries of the subspace indicate acceptable ranges of vector values;
   querying the spatial data structure to obtain a first set of recommendable items that are included in the determined subspace;
   calculating a score for each item within the obtained first set of recommendable items based on the plurality of the user models and a characterization vector associated with each item, wherein calculating the score involves calculating a model-specific output for each user model and calculating a weighted sum of model-specific outputs over the plurality of user models;
   ranking the items within the obtained first set of recommendable items based on calculated scores; and
   recommending one or more top-ranked items to the user.

8. The computer-readable storage medium of claim 7, wherein calculating the model-specific output involves:
   identifying elements in the characterization vector that correspond to parameters of the user model; and
   calculating the model-specific output as a function of the identified elements and the corresponding parameters of the user model.

9. The computer-readable storage medium of claim 7, wherein the method further comprises:
   identifying an additional spatial data structure that corresponds to a different vector space;
   querying the additional spatial data structure to obtain a second set of recommendable items; and
   generating a combined set of recommendable items using the first and the second sets of recommendable items.

10. The computer-readable storage medium of claim 7, wherein the plurality of items includes one or more of:
    a web page;
    a consumer item;
    an activity;
    a venue; and
    a location.

11. The computer-readable storage medium of claim 7, wherein the method further comprises updating a context graph associated with the user based on the received context information.

12. The computer-readable storage medium of claim 7, wherein the spatial data structure is segmented into cells, and wherein a respective cell stores items having vector values within boundaries of the cell.

13. A recommendation computer system for providing a recommendation to a user, comprising:
   a processor;
   a memory;
   an activity-detection module configured to detect user activities and/or interests based on context information associated with the user;
   a model-updating mechanism configured to update a plurality of user models based on an output of the activity-detection module;
   a spatial data structure configured to store a plurality of items, wherein the spatial data structure corresponds to a vector space, and wherein a respective item is stored within the spatial data structure based on a vector value associated with the item;
   a subspace-determination module configured to determine a subspace within the vector space based on the updated user models, wherein boundaries of the subspace indicate acceptable ranges of vector values;
   a querying mechanism configured to query the spatial data structure to obtain a first set of recommendable items that are included in the determined subspace; and
   a mixed-model recommender configured to:
      calculate a score for each item within the obtained first set of recommendable items based on the plurality of the user models and a characterization vector associated with each item, wherein calculating the score involves calculating a model-specific output for each user model and calculating a weighted sum of model-specific outputs over the plurality of user models;
      rank the items within the obtained first set of recommendable items based on calculated scores; and
      recommend one or more top-ranked items to the user.

14. The recommendation system of claim 13, wherein while calculating the model-specific output, the mixed-model recommender is further configured to:
   identify elements in the characterization vector that correspond to parameters of the user model; and
   calculate the model-specific output as a function of the identified elements and the corresponding parameters of the user model.

15. The recommendation system of claim 13, further comprising:
   an additional spatial data structure that corresponds to a different vector space;
   wherein the querying mechanism is further configured to:
   query the additional spatial data structure to obtain a second set of recommendable items; and
   generate a combined set of recommendable items using the first and the second sets of recommendable items.

16. The recommendation system of claim 13, wherein the plurality of items includes one or more of:
   a web page;
   a consumer item;
   an activity;
   a venue; and
   a location.

17. The recommendation system of claim 13, further comprising a context graph updating mechanism configured to update a context graph based on the output of the activity-detection module.

18. The recommendation system of claim 13, wherein the spatial data structure is segmented into cells, and wherein a respective cell stores items having vector values within boundaries of the cell.

19. The recommendation system of claim 13, further comprising an item-characterization module configured to generate a characterization vector for an item.

* * * * *